United States Patent
Conn et al.

[11] 3,965,007
[45] June 22, 1976

[54] PROTEIN SKIMMER

[76] Inventors: Arnold Conn, 253 West End Ave., Manhattan Beach, N.Y. 11235; Harvey K. Cohen, 400 Cozine Ave., Brooklyn, N.Y. 11207

[22] Filed: Sept. 17, 1973

[21] Appl. No.: 397,639

[52] U.S. Cl. .............................................. 210/169
[51] Int. Cl.² ........................................... E04H 3/20
[58] Field of Search ................... 210/169, 197, 221; 119/5

[56] References Cited
UNITED STATES PATENTS

| | | | |
|---|---|---|---|
| 894,056 | 7/1908 | Rogers | 210/169 X |
| 1,055,082 | 3/1913 | Rogers | 210/169 X |
| 3,616,919 | 11/1971 | Feddern | 210/169 |
| 3,661,262 | 5/1972 | Sanders | 210/169 |
| 3,687,291 | 8/1972 | Willinger | 210/169 |

*Primary Examiner*—Theodore A. Granger
*Attorney, Agent, or Firm*—Peter L. Berger

[57] ABSTRACT

A protein skimmmer for use in an aquarium having a recirculating water flow system. The skimmer is for removing dissolved organic compounds from the water in the system by foam fractionation, the protein skimmer including a container for receiving a frothy scum of foam carried thereto by a connecting tube directly placed in the path of the recirculating water, the tube including a baffle system for creating upward pressure enhancing the lift of the foam to the container.

6 Claims, 2 Drawing Figures

PROTEIN SKIMMER

BACKGROUND OF THE INVENTION

This invention relates to a protein skimmer, and more particularly, to a protein skimmer for use in a water recirculating system.

In aquarium systems, many surface-active organic compounds can be concentrated in a foam produced by an air stripping process. This air stripping process removes the dissolved organics by a process known as foam fractionation. The foam fractionization, as presently constituted, is of two forms. One takes that of the form of an air lift air stripper in which the water within the recirculating system is mixed with diffused air and carried upwardly in a column, the top of the column eventually producing a frothy scum or foam which forces its way up into a container, the container being periodically cleaned. Such an air stripping device or protein skimmer is known as a direct-current type.

Another type of air stripping device or protein skimmer is a counter-current apparatus in which water moves in the opposite direction of the air flow. Part of the air moves downward instead of it all moving upward as it does in the aforedescribed direct-current type. A foam or scum is also formed at the top of a vertical contact tube which is carried into a container, the container being periodically cleaned.

These prior protein skimmers are generally unique items unto themselves, generally comprising the above described components. These components are generally large, costly to manufacture, difficult to assemble and often inefficient.

An object of this invention is to provide a protein skimmer which has improved characteristics.

Another object of this invention is to provide such a protein skimmer which is adaptable to be used with prior art aquarium system components, thus utilizing the functions of the prior components in achieving the air stripping.

Yet another object of this invention is to provide such a protein skimmer which is easy to manufacture, convenient to assemble and inexpensive.

Another object of this invention is to provide such a protein skimmer which efficiently removes the dissolved organics from the recirculating water system.

Other objects, advantages and features of this invention will become more apparent hereinafter.

SUMMARY OF THE INVENTION

In accordance with the principles of this invention, the above objects are accomplished by providing an aquarium having a recirculating water flow system, a dissolved organic compound remover, otherwise known as a protein skimmer for removing the organics from the water in the aquarium system by foam fractionation in which diffused air is injected into the recirculating system. The protein skimmer or remover comprises a container adapted to receive the foam or frothy scum being carried upward rising above the water recirculating system and carried to the container by a connecting tube. Thus, this invention provides a simple yet effective connecting tube and container for carrying the frothy scum out of the water recirculating system, yet utilizes the existing air diffuser apparatus presently available in which the diffused air is directly infused into the recirculating water system. Such an aquarium filter recirculation system is manufactured by Nektonics Research and Development Co., Ltd. and is more clearly described in U.S. Pat. No. 3,720,318.

As a further feature of this invention, the connecting tube at its lower end forms a baffle type structure for capturing the surface-active organics and carrying them upwardly to the container connected above the recirculating system. The baffle thus forms an upward pressure means aiding the rising of the foam into the container.

DETAILED DESCRIPTION

Figure 1:
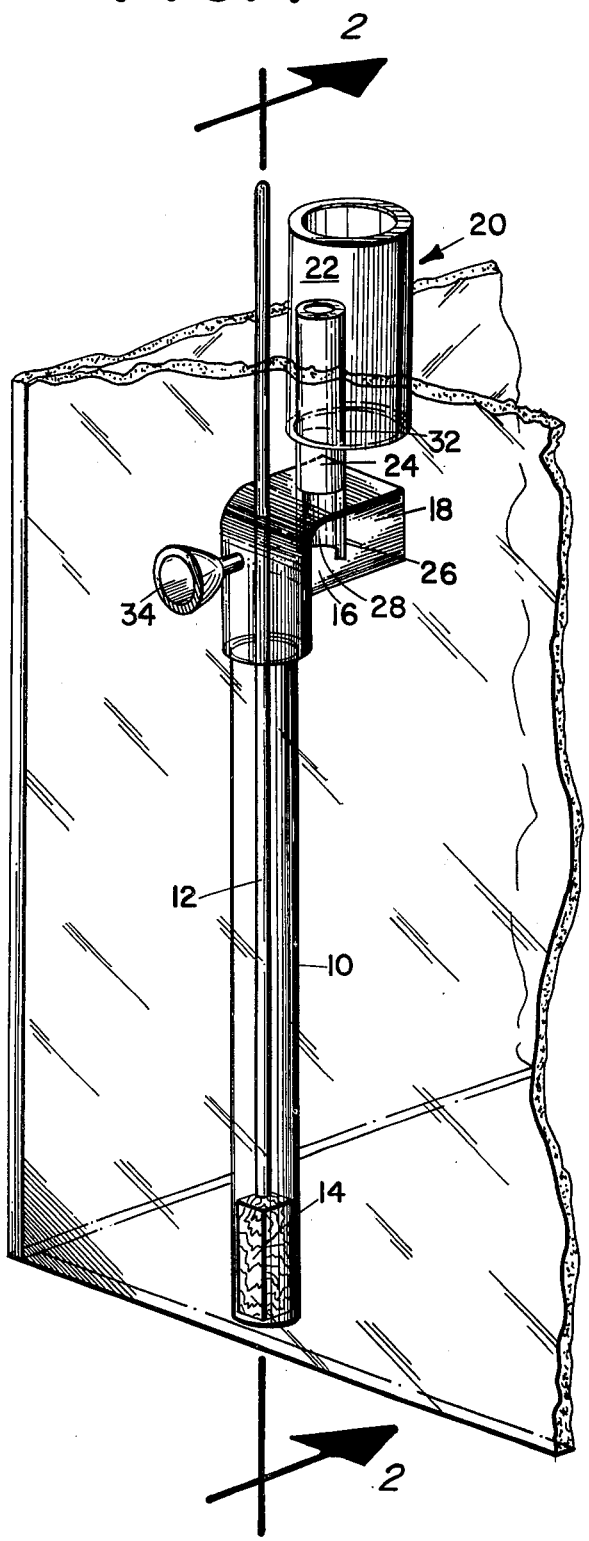
FIG. 1 is a perspective view of the protein skimmer of this invention for use in an aquarium.
Figure 2:
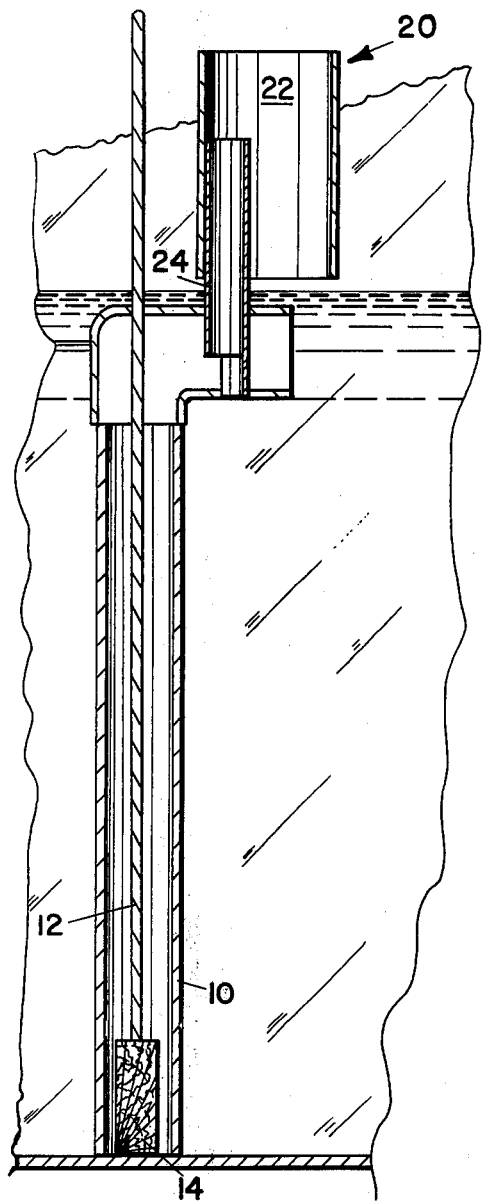
FIG. 2 is a sectional view taken along lines 2.2 Of FIG. 1.

Referring to the drawings, and in particular to FIGS. 1 and 2, there is shown an air lift tube 10 having an inner concentric air carrying tube 12 terminating in an air diffuser 14, the air diffuser 14 allowing air to enter the column or tube 10 at the injection point. The diffused air produces small numerous bubbles and as the total surface area of the bubbles rises, the air stripping process takes place. In U.S. Pat. No. 3,720,318, the air lift tube 10 forms a part of aquarium filter system which is generally available. The air lift tube 10 terminates at its upper end in an elbow bend 16 which allows water to be carried up and to be returned to the aquarium through opening 18, the returning water carrying the diffused air bubbles emitted by diffuser 14. For more details as to the nature and operation of the aquarium filter partially illustrated in FIGS. 1 and 2, reference is made to the prior above-identified patent.

In accordance with the principles of this invention, a protein skimmer or dissolved organic compound remover 20 is provided which is attached above the water recirculating system to the elbow portion 16. The dissolved organic compound remover or protein skimmer 20 comprises a container means 22 adapted to receive and hold the organics. A connecting tube means 24 is provided between the recirculating water and the container 22, the connecting tube simply carrying the organics in a foam to container 22. The container is removable with or without connecting tube 24 so as to be periodically cleaned.

In accordance with this invention, merely the provision of the connecting tube and container allows for the protein skimmer function to be accomplished without the necessity of excessively long lift tubes or counter-current recirculating systems as found in the prior art. Thus, such a protein skimmer is relatively inexpensive to manufacture, and since a part of its functioning beneficially uses an existing component in an aquarium filter, duplication of such functions is clearly avoided.

As yet another feature of this invention, the bottom end of connecting tube 24 forms a baffle means 26, the baffle means being directly placed in the flow of the recirculating water. Thus, the baffle means forms an upward directed pressure means to assist the rising of the foam or scum in connecting tube 24 to container 22. As can be seen, the baffle means is formed by removing a portion of the bottom end of the connecting tube so as to provide a facing surface 28 for performing the baffle function.

As can be seen in FIG. 1, the connecting tube 24 is insertible in an aperture in elbow 16 and there is provided in container 22, an aperture 32 suitable for receipt of the connecting tube 24. As an alternative, the connecting tube and container 22 could be molded as a single item with the entire assembly removable from elbow portion 16.

There is provided a suction member 34 adapted to fit against the side of the aquarium so as to maintain the protein skimmer and connecting tube 24 in a vertical orientation.

The above invention has been described as one preferred embodiment, while other variations thereof are deemed to be covered and protected by this patent application.

We claim:

1. Aquarium foam removal means in combination with an aquarium air lift water recirculating system, said system comprising a vertical air lift conduit with an inlet near the bottom thereof and air discharge means within said conduit near the bottom thereof, a horizontal conduit section with a first end in fluid communication with the upper end of said vertical conduit and an opposite open end for discharge of fluid therefrom, said foam removal means comprising baffle means arranged in said horizontal conduit section, a vertically arranged tube with an open upper end and a lower end connected to the horizontal conduit section and constructed and arranged to receive foam directed interiorly thereof by said baffle means, container means with sidewalls and a closed bottom and an open upper end, said container bottom located above said horizontal conduit section and said sidewalls surrounding said tube whereby foam directed into said tube is discharged from the upper end of said tube into said container.

2. A dissolved organic compound remover as set forth in claim 1, wherein the bottom end of said connecting tube means comprises a baffle surface facing the direction of water flow to interfere therewith and aid the rising of said foam into said container means.

3. A dissolved organic compound remover as set forth in claim 1, wherein said baffle surface comprises a concave facing semicylindrical surface formed at the bottom end of said connecting tube means.

4. A dissolved organic compound remover as set forth in claim 3, wherein said container means and connecting tube means comprise an integral unit.

5. A dissolved organic compound remover as set forth in claim 3, wherein said container means and said connecting tube means are separate components, said container means being provided with connection means for connection with said connecting tube means.

6. A dissolved organic compound remover as set forth in claim 5, wherein said connection means comprises an aperture formed in the bottom of said container means for receiving and holding said connecting tube means.

* * * * *